United States Patent Office 3,372,038
Patented Mar. 5, 1968

3,372,038
SILICATE COATINGS
Helmut Hans Wilhelm Weldes, Havertown, and David I. Netting, Swarthmore, Pa., assignors to Philadelphia Quartz Company, Philadelphia, Pa., a corporation of Pennsylvania
No Drawing. Continuation-in-part of application Ser. No. 311,215, Sept. 24, 1963. This application Aug. 18, 1964, Ser. No. 390,447
9 Claims. (Cl. 106—1)

This application is a continuation-in-part of application Ser. No. 311,215 filed Sept. 24, 1963, now Patent No. 3,345,194.

This invention relates to the preparation of corrosion-resistant coatings on metal and comprises the preparation of coatings having powdered metals, such as Zn, Al, Pb, Ti, Fe and their alloys, dispersed in an aqueous vehicle of an organic ammonium silicate.

The coating compositions of this invention are adapted to be applied to metal surfaces by spraying, dipping, brushing, roll-coating or the like and may be air-dried or baked at suitable temperatures to produce a hard, flexible, tenacious coating film which is resistant to abrasion and protects the substrate from corrosion.

BACKGROUND

In the known aqueous systems of the prior art designed for the preparation of corrosion-resistant coatings the water soluble or water dispersible binder may be an aqueous latex, an alkali metal silicate, an organic silicate ester, a colloidal silica sol, or the like; the coating compositions being applied to metal surfaces and then treated to produce a protective film thereon. While such coating compositions containing finely divided metals provide useful protective coatings for metallic surfaces, various drawbacks have been noted. The compositions of the alkali metal silicate must be carefully controlled since the use of highly concentrated alkali metal silicate solutions may cause a reaction to take place with evolution of gases. This results in the formation of blisters in the coating film which is, of course, undesirable. These binders also require post-cure applications, such as the use of phosphoric acid as a secondary application.

If the self-curing additives, such as lithium compounds and boric oxide, etc. are used, the coatings are inferior in the degree of insolubility, are slow drying and slow curing. The organic orthosilicate ester binders tend to form a rather soft coating which is not sufficiently abrasion-resistant. These corrosion-resistant coatings of the prior art also require a very carefully prepared metal surface, and sand blasting to a white metal surface is almost always necessary. Furthermore, the free metallic zinc in the coatings is likely to cause undesirable reactions in contact with gasoline and to effloresce on contact with sea water.

The preparation of corrosion-resistant inorganic coatings on metal by the use of aqueous alkali metal silicate solutions with finely divided metal providers dispersed therein is well-known. The early art is reviewed by James G. Vail in "Soluble Silicates," volume II, Reinhold Publishing Co., New York (1952) pages 283–284. More recent patents include Munger et al. 2,998,323; Drummond 2,765,237 and MacMahon 3,130,061.

The development of our invention will be described in terms of the use of metallic zinc, although it will be recognized that in general these conditions apply to all metallic powders. The zinc-rich, corrosion-resistant metal coatings of the prior art have suffered from certain insufficiencies:

(a) The paint prepared for application to the surface is quite reactive and has a very short pot life of less than 24 hours;

(b) The paint therefore has to be mixed immediately prior to use;

(c) The paint components have to be sold in multiple containers and application involves from two to four, or even more, steps;

(d) In many such systems the coating has to be set by application of a second coating of a reactant material;

(e) Where the coatings are self-hardening or self-curing they must be applied quickly and the setting or hardening process is usually slow.

In our copending application, Ser. No. 311,215, of which this is a continuation-in-part, we have disclosed a new aqueous binder system for coatings which is both organic and inorganic and may be described as an organic ammonium silicate. In that application we disclose the effect of adding PbO in forming hard scratch-resistant coatings, the special applicability of alkyltriethanolammonium silicates as binders for coatings on metals, and the addition of metallic zinc to these coatings to promote resistance to corrosion of metal substrates, especially the corrosion of ferrous substrates.

OUR INVENTION

We have found now not only that corrosion resistant, insoluble, air-curing coatings from aqueous systems can be formed using organic ammonium silicates and PbO with metallic powder, such as zinc metal powder, for example, but that even without the presence of the lead oxide strongly adherent, insoluble, air-curing, corrosion-resistant coatings can be obtained when the metallic powder is present, and that in the presence of lead oxide these combinations of organic ammonium silicates and metal powders have a greatly extended pot life of seven days or more. Furthermore, we have found that if dry powders of the components are mixed together, they may be stored for long periods without deterioration, and after dispersion with water have a further long, useful pot life for hard, flexible, tenacious, self-curing coatings which are resistant to corrosion over pH ranges normal for such compositions. This has obvious commercial economies in the reduction of freight costs, ease of handling and application, etc.

PROPERTIES OF THE COATING

These corrosion-resistant coatings of our invention require less preparation of the surface, become hard and water-resistant immediately on drying and furthermore are self-curing. Thus the labor costs are distinctly lower since less surface preparation is required and much less time is required for application. In the compositions of the prior art, it is not uncommon to sell kits of three or more units for the preparation of the total coat. Furthermore, the overall costs of the raw materials for our compositions are reduced, and our coatings have improved adhesion with thin coatings, high flexibility, and extreme hardness. The zinc apparently interacts with and is protected by the binder and does not thereafter deleteriously affect gasoline or interact with water on immersion.

When heated at high temperatures, the organic portion of the silicate burns off, leaving the silicate which reacts with the metal powder forming a hard, corrosion and abrasion resistant coating of metal silicate. These coatings are exceptionally stable and have long, useful lives, even at high temperatures.

Thus the coatings of our invention are hard, strongly adherent and corrosion-resistant on metal. They withstand extremes of weather and natural environments, such as sea water, and may be used on the holds and hulls of ships, missile towers, refinery equipment, boiler stacks, gasoline engine manifolds, and similar surfaces exposed to corrosive conditions and/or high temperatures without deterioration of their weather-resistant properties.

A measure of the stability of the aqueous formulation is the time which elapses until the first measurable amount of hydrogen is produced by the reaction of the binder and the metallic zinc. With alkali metal silicates this time is from 1 to 24 hours. Mixtures of the organic ammonium silicate binders containing metallic zinc pigments were made with 20 ml. of the aqueous organic ammonium silicate (12.50 $SiO_2$:methyltriethanolammonium ion) at 32% of $SiO_2$, 1.5 grams of PbO (18.5% based on the silica), and 60 grams of powdered zinc. The containers were closed and any gases produced were collected in tubes. The following table shows the age of the mixtures when gas started to form. A total of about 100 ml. of gas was released from each mixture:

| Zinc dust: | First gas formation, days |
|---|---|
| AA-1 | 24 |
| #1 | 30 |
| High efficiency | 25 |
| #111 | 18 |

THE ORGANIC AMMONIUM SILICATE

The organic ammonium silicates are fundamentally inorganic silicates. Thus their reactions are characteristic of electrostatic bonds rather than of the covalent bonds of the organic silicate esters, such as ethyl orthosilicate. Since these organic ammonium silicates are alkali silicates, rather than silica sols, they react readily with metals and metal salts which accounts for their ability to set rapidly and form very insoluble adherent coatings with metals and other hydrophilic surfaces. The volatility and/or instability of the cation of organic substituted ammonium at relatively low temperatures after reaction of the silicate ion accounts for the high thermal stability and strength characteristics of the residual film after heating to high temperatures. There is no fluxing alkali cation remaining in the coating.

We prefer to use organic ammonium silicates that can be characterized by the formula:

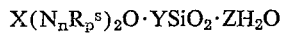

$$X(N_nR_p{}^s)_2O \cdot YSiO_2 \cdot ZH_2O$$

wherein:

N represents a nitrogen atom; $n$ is a small integer less than 10 and preferably less than 5; X, Y and Z represent numbers defining the relative amounts of each of the component parts of the compound. Specifically, X is 1, Y is preferably between 0.5 and 50, and Z is preferably between 0 and 99; R represents alkyl radicals containing between about 1 and 20 carbon atoms, at least one of which is an omega hydroxy alkyl group (preferably one or more of these R groups are ethanol groups and especially preferred are the alkyl ethanol combinations); up to four R groups are associated with each N;

$p$ is at least 4, indicating total bonds of R groups to N; and $s$ is an integer from 1 to $p$, indicating the number of different types of R groups.

In a more specific sense, it is believed that the organic ammonium silicate settable components useful in connection with this invention can be characterized by the formula:

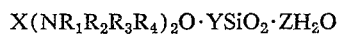

$$X(NR_1R_2R_3R_4)_2O \cdot YSiO_2 \cdot ZH_2O$$

wherein N, X, Y and Z have the significances noted above and $R_1$, $R_2$, $R_3$ and $R_4$ represent alkanol radicals containing between about 1 and 20 carbon atoms.

Preferred specific examples of organic ammonium silicates useful in accordance with this invention would include (a) sodium-free tetraethanolammonium silicate, (b) N,N,N'-tris-(β-hydroxyethyl)-N'-[tris - (β - hydroxyethyl) - ethylammonium] - piperazinium silicate, (c) diethanol morpholinium silicate, (d) hexaethanolethylene diammonium silicate, (e) methyl triethanolammonium silicate, (f) dimethyl diethanolammonium silicate, (g) ethyl triethanolammonium silicate. We prefer those compounds described in our copending application, Ser. No. 311,215, with ratios of silica to organic ammonium ion of between 4.5 and 13.0, as above a ratio of 13.0 the zinc dust can be rubbed off of a dry coating and the whole coating can be easily rubbed off after soaking in water for one hour. Similar coatings made with the ordinary commercial silica sols also may be easily rubber away after soaking. On the other hand, ratios more alkaline than 4.48 do not dry out. A ratio of 4.48 provides a coating which is somewhat softer than normal and, therefore, is approximately the lower limit. Coatings prepared with the alkylethanolammonium silicates are somewhat harder and have a better adhesion than coatings prepared with the tetraethanolammonium silicates and, therefore, we prefer to use the alkylethanolammonium silicates, such as methyltriethanolammonium silicate.

As these organic silicates react with soluble calcium salts, zinc metal powders with additives such as CaO will not make satisfactory coatings. The particle size of the zinc will determine the smoothness of the finished surface and affect the viscosity of the overall system. In preparing these formulations, it is important to balance the $SiO_2$ content of the binder. Too high a concentration may lead to crazing of the film while too low a concentration will not leave sufficient silicate to hold the pigment in place. We have found, as shown in our parent application, that the optimum content of $SiO_2$ in the binder system will fall at about 32% $SiO_2$, more or less.

ADDITIVES

A thickening and gelling agent is generally useful. We prefer hydrous siliceous fillers which generally are non-reactive but will increase the consistency of the mix and, in particular, we have found that hydrous magnesium silicates, such as Ben-A-Gel, sold by National Lead Co., are particularly effective. The use of a thickening agent develops the best paint consistency characteristics, forming paints which leave smooth, continuous films and do not run or sag. We have found, however, that it is better not to try to add the thickening agent directly but, rather, to prepare an aqueous suspension of the thickener and then to add this suspension to the rest of the vehicle or binder. With hydrated magnesium silicate, for instance, we have found that the addition of 0.32 to 0.66% based on the silica present in the binder will increase the adhesion from an initial figure of 400 g. to a figure of 600 g. as determined with the Hoffman Scratch-Hardness Tester.

The addition of lead oxide, or equivalent materials, is described in our parent application. In the metallic pigmented paints, such as the zinc-rich coatings, based on our organic ammonium silicates, the lead oxide is not necessary and, in fact, decreases the water-resistance of the coating. Coatings of tetraethanolammonium silicate binders with ratios between approximately 9 and 13 cannot be rubbed off after soaking for one hour in water, but coatings made from the same silicate with the addition of 18.5% of lead oxide based on silica can be rubbed off the metal substrate after soaking for an hour in water. The addition of lead oxide does not have as great an effect on the alkyltriethanolammonium silicate binders as on the tetraethanolammonium silicate binders, and coatings containing 18.5% of lead oxide with the methyltriethanolammonium silicates in a ratio range from 9.7 to 12.5 cannot be rubbed off after soaking for one hour in water. On the other hand, silica sols or higher ratio tetraethanolammonium silicates, such as 22.5, as well as lower ratios, such as 4.5 or below, all gel in the ball mill while lead oxide is being ground into the mixture. They are thus much too reactive with the lead oxide.

On the other hand, we have found that while the addition of lead oxide to the metal powder-rich coating compositions decreases the water-resistance of the coating, it greatly increases the pot life of the paint. With no lead oxide in the paint, 24 hours is the average useful life; while with 18.5% PbO, based on the $SiO_2$, ground into the silicate vehicle the average useful life of the paint is at least 7 days. We have further found that this useful life is maintained even after excess PbO is removed from the binder solution.

As indicated above, the use of multiple coatings is a regular practice in the industry. We have found that as a base vehicle our zinc-rich coatings of this invention are very effective. They may be covered with a lead oxide coating of our parent application and an organic base vehicle coating may be applied over the lead oxide coating or in place of it.

It is, of course, possible to include inorganic extenders, such as red lead, zinc oxide, iron oxide, aluminum oxide, etc. and inorganic pigments such as iron oxide, titanium oxide and the like. Mica, bentonite, and the like, may be used to increase flexibility in the coating.

It is also well-known to prepare waterproof cements using large amounts of lead oxide with small amounts of glycerine. In our systems it was found that in the organic ammonium silicate systems glycerine did not appear to react with the lead oxide but did appear to react with the lead oxide in the commercial silica sol systems. In general, small amounts of glycerine increased the drying time of the coatings and larger amounts increased the water solubility of the coatings.

THE EXAMPLES

The following examples are given for the purpose of illustrating the invention and include the best mode contemplated by the inventors for carrying out their invention. They are not to be construed as limiting the invention which is defined in the claims. As indicated above, the use of metallic powders has been developed with metallic zinc powders as exemplary compositions.

In the examples we have used the following materials.

Organic ammonium silicates (indicated in tables as OAS)

1—Tetraethanolammonium ion: 22.5 $SiO_2$
5—Tetraethanolammonium ion: 13.05 $SiO_2$
4—Tetraethanolammonium ion: 9.69 $SiO_2$
3—Tetraethanolammonium ion: 4.48 $SiO_2$
610—Tetraethanolammonium ion: 1.89 $SiO_2$
220—Methyltriethanolammonium ion: 12.5
222—Methyltriethanolammonium ion: 9.54

*Zinc dusts*

AA-1—From General Smelting Co.—average particle size 9 microns with 97.5% through −325 mesh. This is 97.0% metallic zinc, 2.85% zinc oxide and 0.1% Pb.

Asarco #1—American Smelting & Refining Co.—particle size of about 8 microns with 97% through 325 mesh. It is 97.0% zinc, 2.5% zinc oxide, 0.2% Pb, and 0.2% Fe.

Asarco high efficiency—Has an average particle size of 3.8 to 4.5 microns with 99% through 325 mesh. It is 96.0% metallic zinc, and 2.9% zinc oxide.

Asarco LD 111—Comparable to Asarco #1, and has about 97.5 to 98% metallic zinc with 2.0% zinc oxide, and an average particle size of 5.5 to 7.5 microns.

All samples of metallic zinc containing CaO as a gassing retardant were found to react with the silicate within 30 minutes and, therefore, are not satisfactory for use with organic ammonium silicate vehicles.

Ben-A-Gel is a hydrous magnesium silicate sold by National Lead Co. Lead oxide, litharge C.P., was obtained from J. T. Baker Chemical Co. as was the manganese dioxide. USP talc was obtained from Merck & Co. Inc., and $TiO_2$ (titanium dioxide) known as R-610 was obtained from Du Pont Co.

The tests were carried out on Q-Panel iron strips obtained from the Q-Panel Co. These are cold-rolled steel panels four inches by eight inches in size with a simulated sand blasted surface on one side.

In general, we have found that the best results were obtained with 55 to 70 grams of metallic zinc dust per 20 ml. of an organic ammonium silicate containing 32% $SiO_2$, for example. With 75 to 100 grams of zinc dust the coating tended to be soft and some zinc dust could be rubbed off. With 55 to 70 grams of zinc powder there was good hardness and complete one-coat coverage. With 40 to 55 grams of zinc dust the coating is hard but the coverage is poor and, in general, two coats are necessary for complete hiding of the metal surface.

In the following tests the paints were prepared by mixing in the proportion of 65 grams of zinc powder to 20 ml. of an organic ammonium silicate solution with 32% of $SiO_2$. The zinc dust was added slowly to the organic ammonium silicate binder with constant stirring. While this composition may be used directly as a paint, it needs frequent stirring. If the silicate in the paint is increased in concentration, or additional zinc dust is added to thicken the paint, the coating tends to crack and the adhesion to the metal is decreased. We have found that the system may be thickened with other fillers and that a hydrous magnesium silicate filler is especially helpful.

When using a filler such as hydrous magnesium silicate, a preferred method of preparation is as follows. The organic ammonium silicate is used at a concentration of 45% $SiO_2$. If lead oxide is to be included, 0.98 lb. of PbO is then milled into each gallon of the organic ammonium siilcate until completely dispersed. A pebble mill or a ball mill may be used. This gives 18.5% by weight of PbO based on the content of $SiO_2$.

The mixture of lead oxide and binder is then diluted with water which has been thickened with 2.6% of hydrous magnesium silicate, such as Ben-A-Gel, using high shear agitation. This thickened water is added with high shear agitation until the silica concentration is 32%.

Then 18.7 lbs. of zinc dust is added to 7.42 lbs. of the binder to make 1 gallon of paint.

The paint may be coated on the metal surface and allowed to dry at room temperature. The paint composition is stable and usable for up to 3 weeks. The paint mixture when completed will contain 71.8% of pigment as zinc dust and 28.2% of binder. The binder is made up of 71.1% of organic ammonium silicate containing 45% of $SiO_2$, 5.9% of PbO, 0.46% of hydrous magnesium silicate and 22.54% of water.

Final concentrations at 32% $SiO_2$ and containing 0.32 to 0.66% of Ben-A-Gel gave satisfactory results as shown in the following table where the percent of filler is based on the total weight of the binder. In this series two coats were applied to vertical metal strips with simulated sand blasted surface:

| Filler, Percent | Zinc | Adhesion, gr. | Appearance |
| --- | --- | --- | --- |
| 0 | #1 | 400 | Paint ran and sagged. |
| 0.32 | #1 | 400–500 | Coating smooth, no runs or sags. |
| 0.46 | #1 | 500–600 | Do. |
| 0.66 | #1 | 500–600 | Do. |
| 0.46 | High Efficiency. | 700–800 | Coating very smooth, no runs or sags, very fine cracks at thick points. |

The test for adhesion is given in grams as determined with the Hoffman Scratch-Hardness Tester.

Water resistance is measured by soaking the specimen for one hour in distilled water and then rubbing the paint surface vigorously with the fingers.

Stability is determined by the time, in days, before gassing begins to occur.

*Example 1*

A series of coatings were prepared from organic ammonium silicates over a range of ratios of organic ammonium ion to silica. In each case 65 grams of zinc dust AA-1 was used with 20 ml. of the organic ammonium silicate containing 32% of SiO₂:

| No. | OAS Cation | Ratio | SiO₂, Percent | Adhesion gr. | Water Resistance | Stability of Paint, days |
|---|---|---|---|---|---|---|
| 1 | (¹) | 150 | 35 | 1 coat, 100; 2 coats, 200. | Can be rubbed off easily. | 0.68 |
| 2 | 1 | 22.5 | 32 | 1 coat, 100; 2 coats, 200. | ----do---------------- | 0.68 |
| 3 | 5 | 13.05 | 32 | 1 coat, 300; 2 coats, 400. | Cannot be rubbed off. | 2.0 |
| 4 | 220 | 12.50 | 32 | 1 coat, 400; 2 coats, 700. | ----do---------------- | 1.0 |
| 5 | 4 | 9.69 | 32 | 1 coat, 200; 2 coats, 400. | ----do---------------- | 1.25 |
| 6 | 222 | 9.54 | 32 | 1 coat, 300; 2 coats, 800. | ----do---------------- | 1.58 |
| 7 | 3 | 4.48 | 32 | 1 coat, 100; 2 coats, 300. | Can be rubbed off with hard rubbing. | 1.25 |
| 8 | 610 | 1.89 | 25 | Coating does not dry out | | |

¹ Silica sol.

In this example no lead oxide was used. It is evident that the silica sol and the tetraethanolammonium silicate at the high ratio of 22.5 did not form a satisfactory coating with the zinc. These systems contain silica almost entirely in the colloidal form. With a ratio of 4.48 there is a high proportion of crystalloidal silica and at 1.89 the silica is almost entirely crystalloidal. In the intervening ratios the proportion of crystalloidal to colloidal silica varies and apparently some crystalloidal silica is necessary for satisfactory reaction with the zinc dust. No doubt, in the case of the most alkaline ratio, there was not sufficient zinc dust to react with the tetraethanolammonium silicate available.

*Example 2*

In this series of tests the paint systems were prepared as in Example 1 but included lead oxide. They were made with 65 grams of zinc dust AA-1, 20 ml. of the organic ammonium silicate containing 32% of SiO₂ and 1.5 grams of PbO (18.5% based on the SiO₂):

| No. | OAS Cation | Ratio | SiO₂ (percent) | PbO (g.) | Adhesion | Water Resistance (after soaking 1 hour) | Stability of Paint, Days |
|---|---|---|---|---|---|---|---|
| 1 | (²) | 150 | 35 | 1.5 | Gelled on ball mill | Could not be used | |
| 2 | 1 | 22.5 | 32 | 1.5 | ----do----------- | ----do----------- | |
| 3 | 5 | 13.05 | 32 | 1.5 | 1 coat, 300; 2 coats, 600 | Can be rubbed off very slightly with hard rubbing. | 7 |
| 4 | 220 | 12.5 | 32 | 1.5 | 1 coat, 400; 2 coats, 800 | Cannot be rubbed off | 7 |
| 5 | 4 | 9.69 | 32 | 1.5 | 1 coat, 200; 2 coats, 500 | Can be rubbed off with hard rubbing. | 7 |
| 6 | 222 | 9.54 | 32 | 1.5 | 1 coat, 400; 2 coats, 800 | Cannot be rubbed off | 7 |
| 7 | 3 | 4.48 | 32 | 1.5 | Gelled on ball mill | Could not be used | |

¹ Adhesion measured in grains using the Hoffman Scratch-Hardness Tester.
² Silica sol.

The gelation on the ball mill indicates a rapid reaction with lead oxide which causes the silicate system to gel before the coating is formed. In the case of the high ratio materials, the lead oxide apparently reacts with the small amount of crystalloidal silica from the organic ammonium silicate which is present. With the most alkaline ratio, 4.48, the reaction is quite rapid and complete, causing gelation of the relatively large amount of silica in the binder.

*Example 3*

In this example the paint was formulated with 20 ml. of #220 organic ammonium silicate to which was added 1.5 grams of lead oxide, 3 grams of talc and 60 grams of zinc dust AA-1. The coatings were brushed on and dried at room temperature for one-half hour after which one panel was placed in a furnace at 500° C. for a half hour. After cooling, both coatings were examined and tested for adhesion of the coating to the metal. The heated coating turned a little darker gray. The non-heated coating could be scratched off the metal with a normal weight of 300 g. using the Hoffman Scratch-Hardness Tester whereas the heated coating could be scratched off only with difficulty using a weight of 2000 grams. This high adhesion strength demonstrates the unusual suitability of the organic ammonium silicate systems for painting surfaces which are exposed to high temperatures.

*Example 4*

Dry mixtures of organic ammonium silicate and metallic zinc powder are readily prepared. The organic ammonium silicate may be a spray dried powder or may be vacuum dried. In this example a tetraethanolammonium silicate having a 10.0 ratio was vacuum dried and mixed with zinc powder. For the preparation of the coating system, water was added to give a concentration of 32% of SiO₂. The mixture when first wetted became very thick and was difficult to stir but as the silicate dissolved, in about 5 minutes, the paint thinned out and became normal. Panels were painted and coatings tested for adhesion and water resistance. A dehydrated methyltriethanolammonium silicate at a 9.5 ratio was compared in the same series of tests. These showed a little better adhesion than the tetraethanolammonium silicate binders but neither could be rubbed off after soaking an hour in water. The dry mixtures were not found to deteriorate on standing.

Similarly, a series of tests were prepared in which lead oxide was also added to the dry mixture of organic ammonium silicate and zinc. The paint system prepared by mixing with water could be used for more than one week.

PAINTS PREPARED FROM MIXTURES OF ZINC DUST AND DRIED OAS

| No. | OAS Cation | Amt. of Silicate (g.) | Amt. of PbO (g.) | Amt. of Zinc Dust (g.) | Water Adhesion, gr. | Water Resistance After soaking 1 hr. | Stability of Paint, Days |
|---|---|---|---|---|---|---|---|
| 1 | #4 | 11.4 | None | 65 | 14.2 mls.—2 coats, 500 | Cannot be rubbed off | 1 |
| 2 | #220 | 11.55 | None | 65 | 14.0 mls.—1 coat, 300; 2 coats, 600. | ----do---------------- | 1 |
| 3 | #222 | 11.55 | 1.5 | 65 | 14.0 mls.—1 coat, 200; 2 coats, 500. | ----do---------------- | 7 |
| 4 | #4 | 11.4 | 1.5 | 65 | 14.2 mls.—1 coat, 200; 2 coats, 500. | Can be rubbed off | 7 |

Example 5

Zinc-rich coatings may be top coated, if desired. This may be done for the sake of appearance or to prevent attack from water and industrial fumes. The top coating may be an organic ammonium silicate pigment paint of our parent application or a paint with an organic binder, or both. The coatings with organic ammonium silicate binders are readily compatible. With the organic top coats, the best adhesion is obtained with vinyl, epoxy, or butadiene systems, and in some cases adhesion of the organic base paint is increased by washing and weathering the organic ammonium silicate base coat.

In some field experiments a gray OAS pigmented paint having the following formulation:

| | |
|---|---|
| Organic ammonium silicate 220 (32% SiO₂) _ml_ | 1000 |
| PbO ground into the silicate with a ball mill _grams_ | 75 |
| Talc _do_ | 200 |
| Manganese dioxide _do_ | 50 |
| Titanium oxide (Du Pont R-610) _do_ | 150 | was used to top-coat zinc-rich OAS coatings. These coatings have not shown any effect of weathering after eight months exposure. A commercial marine paint has been applied as a top coating for OAS zinc-rich coatings. It was found that after weathering for one month small blisters appeared unless the panel was first washed. A series of panels were exposed to the weather, facing east at a 45° slant. The panel coated only with one coat of the above gray pigment paint began to rust after the first rain and was completely covered with rust after 3 months exposure. Other panels, coated either with two coats of the zinc-rich paint or with one coat of zinc-rich paint and one finish coat of the above gray pigment paint, still showed no rust after 8 months.

Example 6

The metal surface of an industrial spray dryer used over a temperature cycle was wire brushed leaving a fine layer of loose rust. A coating of the zinc-rich paint of Example 3 was applied to one section by a brush. Another section was coated with the gray pigment paint of Example 5, and a further section was first coated with the zinc-rich coating and then with the gray pigment paint. A section of aluminum exhaust pipe was painted in the same manner. After 7 months the paint on the aluminum exhaust pipe was in perfect condition; the paint on the steel surface of the dryer was also in perfect condition except for a few spots in the section painted only with the gray pigment paint.

Example 7

Areas on a hot boiler stack were sand blasted free of rust. A coating of zinc-rich paint described below was applied to this hot surface. The water boiled off leaving a rough and uneven surface since the surface temperature was 250–300° F. A similar section was coated with the gray pigment paint of Example 5.

Another area on the blow-out tank of the boiler was cleaned with a wire brush which removed most of the old paint. One area was painted with the zinc-rich paint described below; another with the gray pigment paint of Example 5; and a third was painted first with the zinc-rich paint and top-coated with the pigment paint. This blow-out tank was cold at the time of application and a good, even film was formed. The metal was heated several times a day but not to as high a temperature as the stack. After 6 months there was no evidence of rust on the areas of the stack painted with either the zinc-rich paint or the gray pigment paint. However, on the blow-out tank the area painted with pigment paint had large rust spots whereas the areas first coated with the zinc-rich paint showed no rust at all. Other paints crack and peel off the blow-out tank because of the rapid expansion during heating and cooling.

The zinc-rich paint used had the formula:

| | Percent |
|---|---|
| #220 organic ammonium silicate (45% SiO₂) | 71.2 |
| H₂O | 28.34 |
| Hydrous magnesium silicate (Ben-A-Gel) | 0.46 |
| Lead oxide ground into the organic ammonium silicate, and the residue removed with a centrifuge | 18.5 |

This made 840 parts by weight of binder which was mixed with 2,125 parts by weight of zinc dust (Asarco #1).

Example 8

A manifold on an automobile engine was coated by brushing on a zinc-rich organic ammonium silicate paint having the formulation:

| | |
|---|---|
| #220 organic ammonium silicate (32% SiO₂) _ml_ | 20 |
| PbO _g_ | 1.5 |
| Zn metal powder _g_ | 65 |

The metal was not prepared in any way. After 20,000 miles and a hard winter the coating was still in perfect condition and was unchanged in appearance. Water, snow and salt splashing up on the hot manifold had no effect on the coating.

More or less detailed claims will be presented hereinafter, and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine non-inventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What is claimed is:

1. A corrosion resistant coating composition for metal consisting essentially of:

(a) an aqueous solution of an organic ammonium silicate which is characterized by the formula

$$X(N_nR_p^s)_2O \cdot YSiO_2 \cdot ZH_2O$$

wherein:

N represents a nitrogen atom; $n$ is a small integer less than 10 and preferably less than 5; X, Y, and Z represent numbers defining the relative amounts of each of the component parts of the compound, and more specifically, X is 1, Y is preferably between 0.5 and 50, and Z is preferably between 0 and 99; R represents alkyl radicals containing between 1 and 20 carbon atoms, at least one of which is an omega hydroxy alkyl group; up to four R groups being associated with each N;

$p$ is at least 4, indicating total bonds of R groups to N; and $s$ is an integer from 1 to $p$, indicating the number of different types of R groups, (b) a finely divided zinc powder in the amount of between about 6 to 20 grams of zinc powder per gram of SiO₂.

2. A coating composition according to claim 1 which additionally contains hydrous magnesium silicate.

3. A coating composition according to claim 1 which additionally contains a finely divided lead oxide and a filler.

4. The process of preparing a corrosion resistant coating which consists essentially of:
（a) bringing together an organic ammonium silicate of the type set forth in claim 1 and a filler suspended in water,
(b) admixing the components set forth in (a) using shear agitation, and
(c) thereafter adding a finely divided powdered zinc in the amount of between about 6 to 20 grams of zinc powder per gram of $SiO_2$.

5. The process of forming the composition of claim 3 which comprises milling lead oxide into said organic ammonium silicate solution until completely dispersed said dispersion of lead oxide in organic ammonium silicate being thickened by adding a water suspension of hydrous magnesium silicate and finely divided zinc powder.

6. A dry mixture comprising a powdered organic ammonium silicate as defined in claim 1 and powdered zinc pigment dispersible in water for coating on metal, said zinc powder being in an amount of between about 6 and 20 grams of zinc powder per gram of $SiO_2$.

7. The process of claim 5 in which PbO residue is removed from the binder after dispersion therein.

8. A coating composition according to claim 1 which also contains the soluble residue from a PbO suspension.

9. A composition according to claim 1 wherein said organic ammonium silicate is selected from the group consisting of tetraethanolammonium silicate and methyltriethylammonium silicate.

References Cited
UNITED STATES PATENTS

| | | | |
|---|---|---|---|
| 3,056,684 | 10/1962 | Lopata et al. | 106—1 X |
| 3,202,517 | 8/1965 | Jarboe et al. | 106—14 |
| 2,689,245 | 9/1954 | Merrill. | |
| 2,944,919 | 7/1960 | Morris et al. | |
| 2,998,328 | 8/1961 | Munger et al. | 117—705 |
| 3,100,154 | 8/1963 | Oshima et al. | |
| 3,248,237 | 4/1966 | Weldes et al. | 106—38.35 |

ALEXANDER H. BRODMERKEL, *Primary Examiner.*

DONALD J. ARNOLD, *Examiner.*

L. B. HAYES, *Assistant Examiner.*

UNITED STATES PATENT OFFICE
CERTIFICATE OF CORRECTION

Patent No. 3,372,038                         March 5, 1968

Helmut Hans Wilhelm Weldes et al.

It is certified that error appears in the above identified patent and that said Letters Patent are hereby corrected as shown below:

Column 1, line 38, "siilcate" should read -- silicate --; line 60, "providers" should read -- powders --. Column 4, line 12, "rubber" should read -- rubbed --. Columns 7 and 8, in the second TABLE, sixth column, in the heading, "Adhesion" should read -- Adhesion (1) --; Column 11, line 15, after "dispersed" insert a comma. Column 12, line 8, "triethylammonium silicate" should read -- triethanolammonium silicate --.

Signed and sealed this 23rd day of September 1969.

(SEAL)
Attest:

Edward M. Fletcher, Jr.                    WILLIAM E. SCHUYLER, JR.

Attesting Officer                            Commissioner of Patents